(12) United States Patent
Landry et al.

(10) Patent No.: US 12,448,143 B2
(45) Date of Patent: Oct. 21, 2025

(54) MAGNETORHEOLOGICAL (MR) CLUTCHES FOR HYBRID DRIVETRAIN POWER DISTRIBUTION

(71) Applicant: Textron Innovations Inc., Providence, RI (US)

(72) Inventors: Francois Landry, St-Hippolyte (CA); Olivier Laforest, Montréal (CA); Nicola Pedneault Plourde, Saint Jérôme (CA); Maxime Lapalme, St-Lin-Laurentides (CA)

(73) Assignee: Textron Innovations Inc., Providence, RI (US)

( * ) Notice: Subject to any disclaimer, the term of this patent is extended or adjusted under 35 U.S.C. 154(b) by 248 days.

(21) Appl. No.: 18/316,714

(22) Filed: May 12, 2023

(65) Prior Publication Data

US 2024/0375783 A1    Nov. 14, 2024

(51) Int. Cl.
*F16D 37/00* (2006.01)
*B60L 53/00* (2019.01)
*B64D 35/022* (2024.01)
*F16D 48/06* (2006.01)

(52) U.S. Cl.
CPC ............ *B64D 35/022* (2024.01); *B60L 53/00* (2019.02); *F16D 37/008* (2013.01); *F16D 48/06* (2013.01); *F16D 2500/10412* (2013.01); *F16D 2500/10475* (2013.01)

(58) Field of Classification Search
CPC ......... F16D 2500/10475; F16D 37/008; B64D 35/022
See application file for complete search history.

(56) References Cited

U.S. PATENT DOCUMENTS

| | | | |
|---|---|---|---|
| 9,541,142 B2 * | 1/2017 | Spina | F16D 37/008 |
| 2013/0047772 A1 * | 2/2013 | Shafer | B25J 19/06 |
| | | | 192/58.41 |
| 2018/0029225 A1 * | 2/2018 | Plante | B25J 9/104 |
| 2019/0128340 A1 * | 5/2019 | Denninger | F16D 7/02 |
| 2019/0193278 A1 * | 6/2019 | Larose | B25J 13/025 |

* cited by examiner

*Primary Examiner* — Stacey A Fluhart
(74) *Attorney, Agent, or Firm* — Whitaker Chalk Swindle & Schwartz PLLC; Enrique Sanchez, Jr.; Juan Vasquez

(57) ABSTRACT

Systems and techniques for controlling a power distribution of a hybrid powertrain system using magnetorheological (MR) clutches. In embodiments, MR clutches may be used to control the power transfer from a mechanical power source to a plurality of loads. For example, mechanical power produced by a mechanical power source (e.g., an internal combustion engine (ICE)) may be transferred to each load of the plurality of loads using an MR clutch respectively connected to each load. In this example, the amount of mechanical power transferred from the mechanical power source to each of the loads of the plurality of loads may be controlled and/or managed using the MR clutch connected to each respective load. In embodiments, a load may be engaged or disengaged from the mechanical power source gradually, such as by ramping up or ramping down the amount of mechanical power transferred via the MR clutch to the load.

14 Claims, 6 Drawing Sheets

MAGNETORHEOLOGICAL (MR) CLUTCHES FOR HYBRID DRIVETRAIN POWER DISTRIBUTION

TECHNICAL FIELD

The present disclosure generally relates to hybrid power systems, and more specifically to magnetorheological (MR) clutches for controlling power distribution in hybrid power systems.

BACKGROUND

Vehicles have contributed greatly to progress by enabling us to transport people and freight over great distances in a relatively short time. All vehicles, however, use some form of power or energy to move. One of the most prevalent forms of power includes the internal combustion engine (ICE), which uses the principle of combustion to convert fuel into energy to provide power that may then be used by a vehicle to move. Typical vehicles that may use an ICE may include cars, aircraft, boats, etc.

Another prevalent form of power that may be used by a vehicle may include electric power. In these cases, a power source, such as a battery or a generator may be used to drive an electric motor. The electric motor may provide power that may then be used by the vehicle to move. Typical vehicles that may use an ICE may include cars, aircraft, boats, etc.

In some vehicle implementations, a hybrid power system may be used, in which the power to move the vehicle may be provided using a combination of different power systems. For example, a hybrid system may use a combination of an ICE and an electric motor to provide power to the drivetrain load (e.g., the drivetrain configured to transfer the power from the ICE and/or the electric motor to the propelling component of the vehicle). FIG. 1 shows a typical configuration of a hybrid power system 100. As shown in FIG. 1, hybrid power system 100 may include engine 124, which in this example may be an ICE, and electric motor 114, both operable connected to drivetrain load 118. Drivetrain load 118 may include the drivetrain connected to the propelling component of the vehicle, which may include the wheels of the car, one or more propellers of an aircraft, etc. In this manner, drivetrain 118 may be used to transfer power to the propelling component of the vehicle to cause the vehicle to move.

In the example shown in FIG. 1, engine 124 may be operably connected (e.g., via gearbox 120) to drivetrain load 118, in order to transfer the power generated by engine 124 to drivetrain load 118. In this example, electric motor 114 may be connected to battery 112, which may provide electric power to drive electric motor 114. Electric motor 114 may be operably connected to drivetrain load 118 in order to transfer the mechanical power generated by electric motor 114 to drivetrain load 118. As such, drivetrain load 118 may receive power from one or both of an ICE and an electric motor. In this manner, system 100 may operate using electric and/or internal combustion power, which is the fundamentals of a hybrid power system.

Some hybrid systems may operably connect the ICE to both a drivetrain and to a generator that may be connected to the battery. In these implementations, the power provide by the ICE may be used to propel the vehicle (e.g., using the drivetrain connected to the ICE) and/or to charge the battery connected to the electric motor (e.g., using the generator connected to the ICE). In still other implementations, the electric motor may be used to drive the drivetrain, and the ICE may be used to charge the battery connected to the electric motor. In these implementations, the ICE may not be used to drive the drivetrain. In yet other implementations, the electric motor may be connected to a first drivetrain load (e.g., to drive a first mechanism for propelling the vehicle, such as a first set of propellers) and the ICE may be connected to a second drivetrain load (e.g., to drive a second mechanism for propelling the vehicle, such as a second set of propellers). In these implementations, the ICE may additionally be operably connected to a generator to charge the batter connected to the electric motor. In this manner, the electric motor may be used to drive the first set of propellers, and the ICE may be used to drive the second set of propellers and/or to charge the battery (e.g., via the generator) providing power to the electric motor.

In a typical hybrid power system, however, controlling the distribution of power from the different power systems to the different drivetrain loads has proven a very difficult challenge. This challenge is particularly important, as ensuring that the proper power is delivered to the right drivetrain load may mean the difference between smooth operations and disaster. For example, in an aircraft using a hybrid power system, ensuring that the proper amount of power is provided to the right propellers is extremely important in order to ensure that the aircraft has sufficient lift to remain airborne, as well as to control the direction of flight. Moreover, current hybrid systems lack a robust power distribution system that ensures that power is properly distributed without causing or risking damage to the various components of the vehicle.

SUMMARY

The present disclosure achieves technical advantages as systems and methods that provide functionality for controlling a power distribution of a hybrid powertrain system using magnetorheological (MR) clutches. The present disclosure provides for a system integrated into a practical application with meaningful limitations as a system with functionality that provides an enhanced and improved power distribution management scheme for a hybrid power system to ensure safe and efficient operations. In particular embodiments, MR clutches may be used to control the power transfer from various mechanical power sources to various loads. For example, a hybrid system may include a first mechanical power source of a first type (e.g., an internal combustion engine (ICE)) and a second mechanical power source of a second type (e.g., an electric motor). In this example, an MR clutch operably connected to the first mechanical power source may be used to control and manage the distribution of the mechanical power provided by the first mechanical power source to one or more loads. In this example, an MR clutch operably connected to the second mechanical power source may be used to control and manage the distribution of the mechanical power provided by the second mechanical power source to the one or more loads.

In additional or alternative embodiments, MR clutches may be used to control the power transfer from a mechanical power source to a plurality of loads. For example, a hybrid system may include a mechanical power source (e.g., an ICE), and a plurality of loads connected to the mechanical power source. In this example, mechanical power produced by the mechanical power source may be transferred to the plurality of loads. In embodiments, each load of the plurality of loads may be connected to the mechanical power source using an MR clutch. The amount of mechanical power transferred from the mechanical power source to each of the loads of the plurality of loads maybe controlled and/or managed using the MR clutch connected to each respective load. In embodiments, the plurality of loads may include a first load that may include a generator operably connected to a battery that may be operably connected to an electric motor. In this case, the mechanical power provided by the mechanical power source (e.g., the ICE) may be used to charge the battery used to drive the electric motor.

In embodiments, controlling the mechanical power transfer from a mechanical power source to a load using an MR clutch may include engaging the load to the mechanical power source using the MR clutch, in which case the engagement may allow mechanical power to be transferred from the mechanical power source to the load, and/or disengaging the load from the mechanical power source using the MR clutch, in which case the disengagement may prevent mechanical power to be transferred from the mechanical power source to the load. In embodiments, features of the present disclosure may allow the MR clutch to gradually, and/or progressively, engage or disengage the mechanical power source and the load by ramping up or ramping down the amount of mechanical power transferred via the MR clutch to the load. In some embodiments, features of the present disclosure may allow control of the amount of mechanical power transferred from the mechanical power source to the load using the MR clutch. For example, the MR clutch may be controlled to ensure that a requested amount of mechanical power (e.g., which could be less than the total capacity of the mechanical power source) is transferred from the mechanical power source to the load.

The advantageous result of the features of the present disclosure includes accurate control and distribution of mechanical power from one or more mechanical power sources to one or more loads, a lighter hybrid power system design as traditional mechanical clutches may be heavier components and MR clutches are much lighter, and/or the ability to concurrently operate more than one propulsion system. In addition, a failure mode of the MR clutch may be controlled so that upon detection of a failure of the MR clutch, the MR clutch may fail to engage or disengage. In addition, features of the present disclosure may allow a system to forego the use of overload clutches, as disengagement of a load may be performed gradually (e.g., in a ramp down) allowing the engine to rev down. Furthermore, features of the present disclosure may provide protection for an engine when engaging a load, as engagement of a load may be performed gradually (e.g., in a ramp up), rather than instantaneously, which may be prevent a shock to the engine (e.g., a shock when the engine is suddenly engaged at full force to a load).

Thus, it will be appreciated that the technological solutions provided herein, and missing from conventional systems, include functionality to implement a technical process to replace or supplement current manual solutions or non-existing solutions in hybrid power systems. In doing so, the present disclosure goes well beyond a mere application the manual process to a computer. Accordingly, the claims herein necessarily provide a technological solution that overcomes a technological problem.

It is an object of the disclosure to provide a system for controlling a power distribution of a powertrain system. It is a further object of the disclosure to provide a method of controlling a power distribution of a powertrain system. These and other objects are provided by the present disclosure, including at least the following embodiments.

In one particular embodiment, a system for controlling a power distribution of a powertrain system is provided. The system comprises an engine configured to provide a mechanical power to drive a plurality of loads of the powertrain system, and the plurality of loads. In embodiments, each load of the plurality of loads is operably connected to the engine. The system also comprises a plurality of MR clutches connected to the plurality of loads. In embodiments, each MR clutch of the plurality of MR clutches is configured to operably connect a respective one of the plurality of loads to the engine to transfer mechanical power from the engine to the respective one of the plurality of loads, and to control an amount of mechanical power transferred from the engine to the respective one of the plurality of loads.

In another embodiment, a method of controlling a power distribution of a powertrain system is provided. The method includes operably connecting, using a plurality of MR clutches, a plurality of loads of the powertrain system to an engine configured to provide a mechanical power to drive the plurality of loads. In embodiments, each load of the plurality of loads is operably connected to the engine using a respective MR clutch connected to each load. The method also includes transferring an amount of mechanical power from the engine to each load of the plurality of loads. In embodiments, the amount of mechanical power transferred from the engine to each load of the plurality of loads is controlled using an MR clutch connected to each respective load.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

Figure 1:
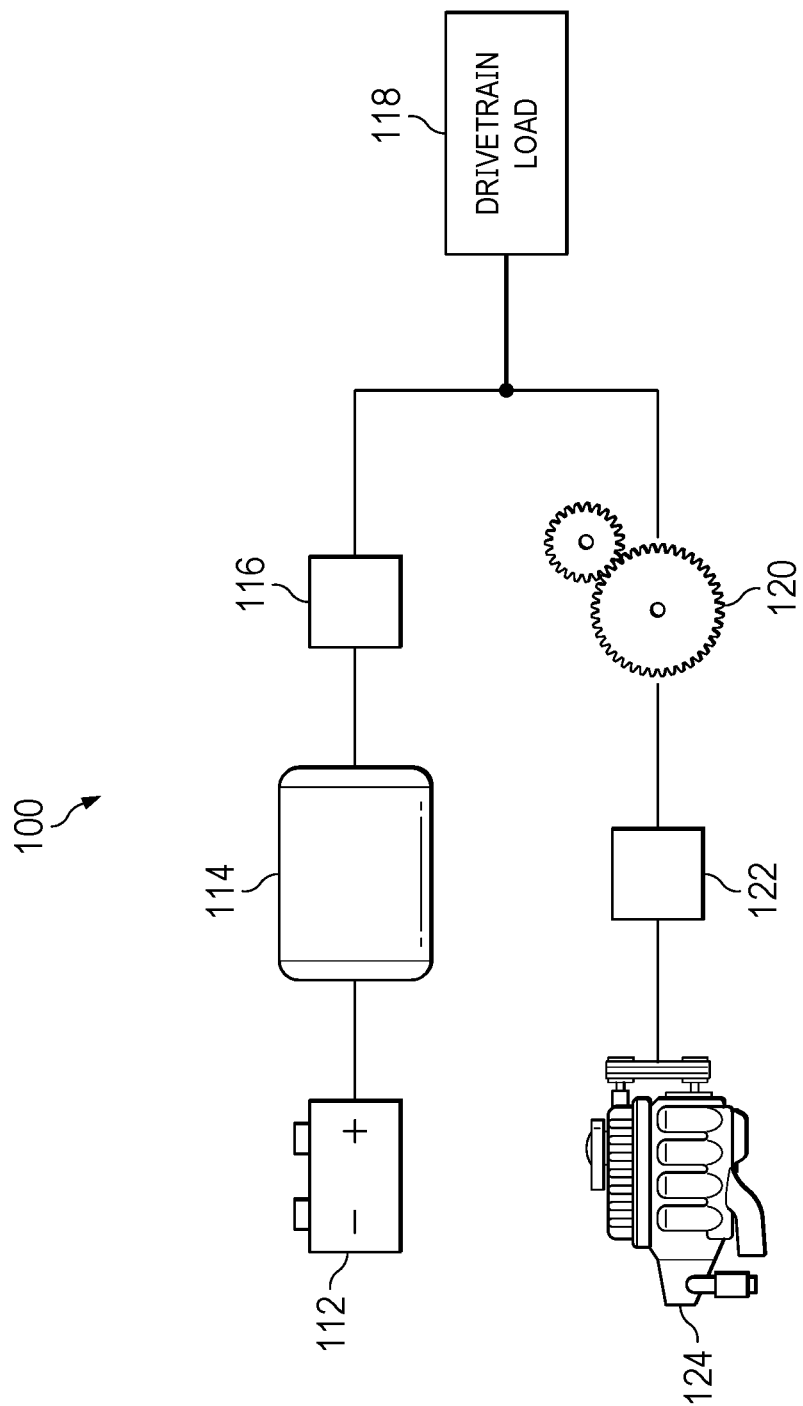
FIG. 1 shows a typical configuration of a hybrid power system.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to systems and techniques that provide functionality for controlling a power distribution of a hybrid powertrain system using magnetorheological (MR) clutches. In embodiments, the functionality provided by the features described herein may represent an enhanced and improved power distribution management scheme for a hybrid power system to ensure safe and efficient operations. In particular embodiments, MR clutches may be used to control the power transfer from various mechanical power sources to various loads. For example, in some embodiments, an MR clutch operably connected to a first mechanical power source may be used to control and manage the distribution of the mechanical power provided by the first mechanical power source to one or more loads, and an MR clutch operably connected to a second mechanical power source may be used to control and manage the distribution of the mechanical power provided by the second mechanical power source to the one or more loads. In additional or alternative embodiments, MR clutches may be used to control the power transfer from a mechanical power source to a plurality of loads. For example, mechanical power produced by a mechanical power source (e.g., an internal combustion engine (ICE)) may be transferred to each load of the plurality of loads using an MR clutch respectively connected to each load. In this example, the amount of mechanical power transferred from the mechanical power source to each of the loads of the plurality of loads may be controlled and/or managed using the MR clutch connected to each respective load.

The features of the present disclosure provide a solution to deficiencies of current systems. For example, as noted above, in a typical hybrid power system, controlling the distribution of power from the different power systems to the different drivetrain loads has proven a very difficult challenge. One solution that has been implemented is the use of mechanical clutches that are used to control the engagement of the different power systems to the different drivetrain loads. For example, with further reference to FIG. 1, hybrid power system 100 may use clutch 116 to control the engagement of electric motor 114 to drivetrain load 118 and may use clutch 122 to control the engagement of the engine 124 to drivetrain load 118. In this example, clutch 116 may be activated to engage electric motor 114 to drivetrain load 118 and in this case, upon engagement, the mechanical power generated by electric motor 114 may be transferred to drivetrain load 118. Similarly, clutch 122 may be activated to engage engine 124 to drivetrain load 118 and in this case, upon engagement, the mechanical power generated by engine 124 may be transferred to drivetrain load 118. On the other hand, clutch 116 may be deactivated to disengage electric motor 114 from drivetrain load 118 and in this case, upon disengagement, the mechanical power generated by electric motor 114 may no longer be transferred to drivetrain load 118. Similarly, clutch 122 may be deactivated to disengage engine 124 from drivetrain load 118 and in this case, upon disengagement, the mechanical power generated by engine 124 may no longer be transferred to drivetrain load 118. In this manner, clutches 116 and 122 may be used to control the power distribution of hybrid power system 100.

However, clutches 116 and 122 may not allow for precise control of the power transfer from engine 124 and electric motor 114 to drivetrain load 118. Typically, clutches 116 and 122 may be configured to engage or disengage the loads from the respective mechanical power source, but with an on or off approach. For example, clutch 116 may engage electric motor 114 to drivetrain load 118 by entirely, mechanically and directly, connecting electric motor 114 to drivetrain load 118. In this case, all the mechanical power provided by electric motor 114 may be applied to the drivetrain load 118 at once. Similarly, clutch 122 may engage engine 124 to drivetrain load 118 by entirely, mechanically and directly, connecting engine 124 to drivetrain load 118. In this case, all the mechanical power provided by electric motor 114 may be applied to the drivetrain load 118 at once, and/or all the mechanical power provided by engine 124 may be applied to the drivetrain load 118 at once. This all or nothing approach may be problematic, as it may cause the electric motor or the engine to be damaged due to the shock of a sudden connection to a load. As noted above, features of the present disclosure provide a solution to deficiencies of current systems.

Figure 2A:
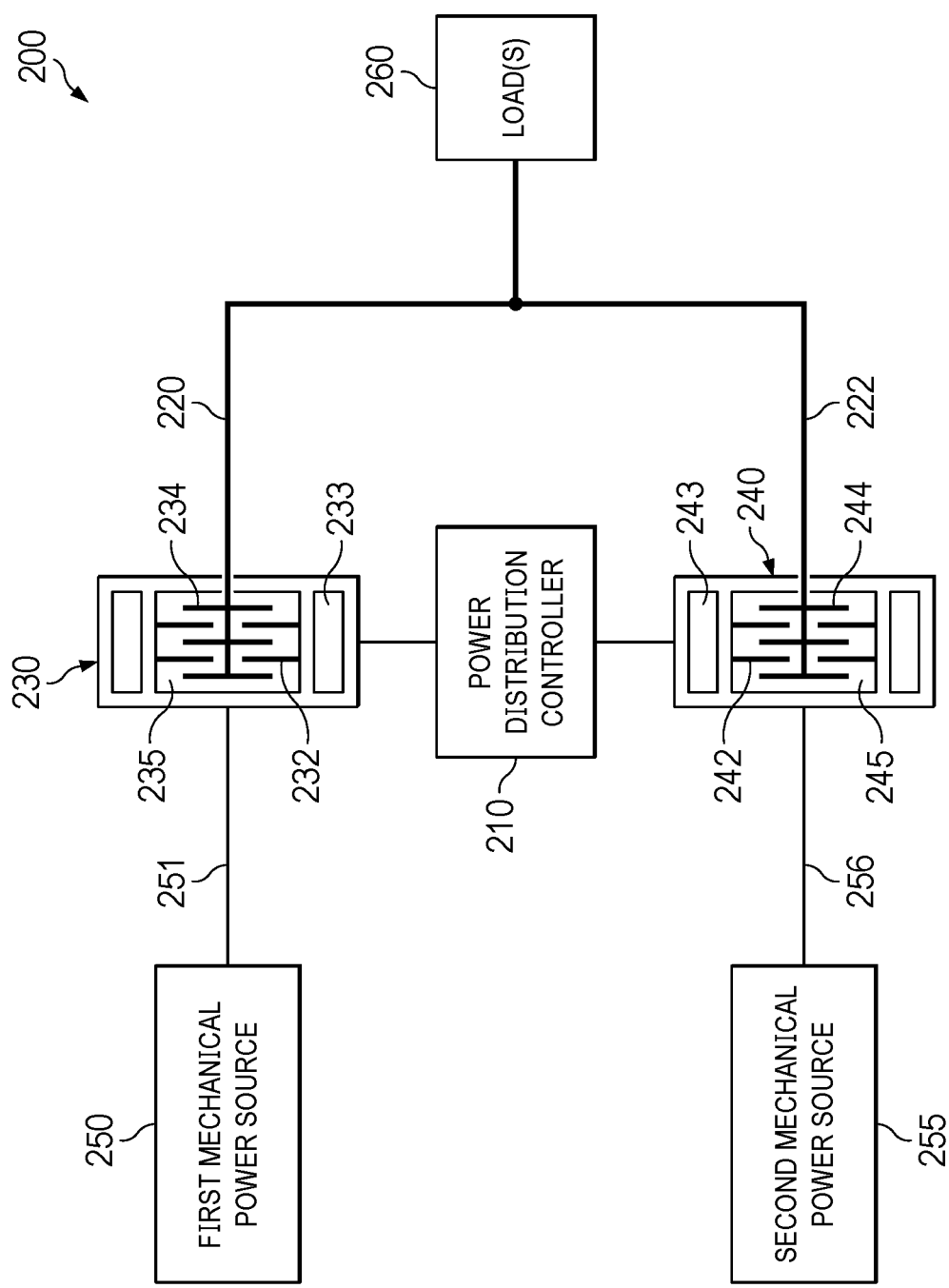
FIG. 2A is a block diagram of an exemplary system configured with capabilities and functionality for controlling a power distribution of a hybrid powertrain system using magnetorheological (MR) clutches in accordance with embodiments of the present disclosure.

FIG. 2A is a block diagram of an exemplary system 200 configured with capabilities and functionality for controlling a power distribution of a hybrid powertrain system using MR clutches in accordance with embodiments of the present disclosure. As shown in FIG. 2A, system 200 may include a plurality of mechanical power sources configured to provide mechanical power to one or more loads. For example, system 200 may be a hybrid power system and may include first mechanical power source 250 and second mechanical power source 255. In embodiments, the first mechanical power source 250 and second mechanical power source 255 may include different power systems. For example, first mechanical power source 250 may include a mechanical power source of a first type (e.g., an ICE) and second mechanical power source 255 may include a mechanical power source of a second type (e.g., an electric motor). In this example, the mechanical power provided by first mechanical power source 250 and second mechanical power source 255 may be transferred to one or more loads 260 using a respectively connected MR clutch. For example, MR clutch 230 may be operably connected to first mechanical power source 250 and operably connected to one or more loads 260. In embodiments, MR clutch 230 may be configured to control the transfer of mechanical power from first mechanical power source 250 to one or more loads 260. MR clutch 240 may be operably connected to second mechanical power source 255 and operably connected to one or more loads 260. In embodiments, MR clutch 240 may be configured to control the transfer of mechanical power from second mechanical power source 255 to one or more loads 260.

In embodiments, one or more loads 260 may include a mechanical load configured to receive the mechanical power transferred from a mechanical power source and to use the mechanical power received to move a vehicle. For example, in embodiments, system 200 may be part of an aircraft and in this case, one or more loads 260 may include one or more propellers. In this example, the mechanical power provided by one or more of first mechanical power source 250 and second mechanical power source 255 (e.g., via MR clutches 230 and/or 240) may be used to rotate the one or more propellers to provide propulsion power to the aircraft. In some embodiments, one or more loads 260 may include a drivetrain of a car, in which case the mechanical power may be used to rotate one or more wheels to move the car. It should be appreciated that these examples of the one or more loads 260 are for illustrative purposes and should not be construed as limiting in any way. In some embodiments, other types of loads may be included in one or more loads 260, such as propellers on a boat, a generator, a turbine, etc. Indeed, one or more loads 260 may include any type of load that may employ mechanical power.

In embodiments, MR clutch 230 may be configured to control the transfer of mechanical power from first mechanical power source 250 to one or more loads 260, and MR clutch 240 may be configured to control the transfer of mechanical power from second mechanical power source 255 to one or more loads 260. In embodiments, controlling the transfer of mechanical power from a mechanical power source to a load (e.g., a load of one or more loads 260) using an MR clutch may include controlling the amount of torque that may be transferred from an output shaft of the mechanical power source to an input shaft of the load. For example, output shaft 251 of first mechanical power source 250 may be connected to MR clutch 230 (e.g., may be connected to input plate 232 of MR clutch 230) and input shaft 220 of a load of one or more loads 260 may be connected to MR clutch 230 (e.g., may be connected to output plate 234 of MR clutch 230). In embodiments, there may be no direct mechanical connection between input plate 232 and output plate 234, which may mean that there may be no direct mechanical connection between output shaft 251 of first mechanical power source 250 and input shaft 220 of the load to which power may be transferred. In embodiments, MR fluid 235 may surround input plate 232 and output plate 234. Controlling the amount of torque that is transferred from first mechanical power source 250 to the load of one or more loads 260 may include varying the viscosity of MR fluid 235. Details of the operations of MR clutch 230 will now be discussed with reference to FIG. 3.

Figure 3:
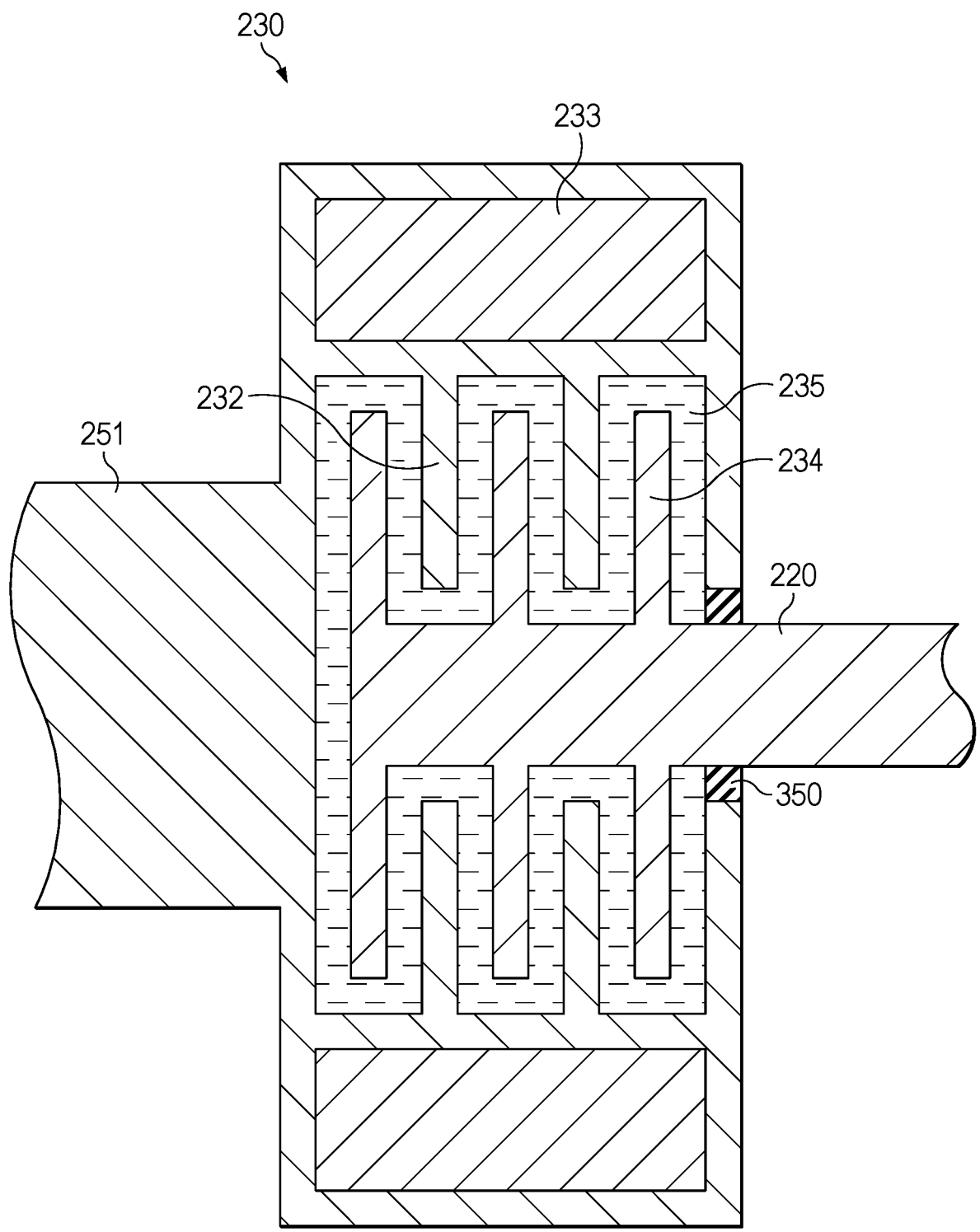
FIG. 3 is a diagram illustrating an example implementation of an MR clutch.

FIG. 3 is a diagram illustrating an example implementation of an MR clutch 230. As shown in FIG. 3, MR clutch 330 may include an input plate 232 and an output plate 234 surrounded by MR fluid 235. In embodiments, input plate 232 may be configured to connect to an output shaft of a mechanical power source (e.g., output shaft 251) and to receive a mechanical power (e.g., in the form of an input torque) from the mechanical power source via output shaft 251. In embodiments, output plate 234 may be configured to connect to an input shaft of a load (e.g., input shaft 220) and to provide at least a portion of the mechanical power received from the mechanical power source (e.g., in the form of an output torque) to the load via input shaft 220. In embodiments, input plate 232 and output plate 234 may not be in direct mechanical connection (e.g., may not directly contact each other). Instead, input plate 232 and output plate 234 may be surrounded by MR fluid 235.

In embodiments, MR fluid 235 may be configured to provide a torque transfer medium for transferring a portion of the torque from input plate 232 to output plate 234. For example, in embodiments, MR fluid 235 may include iron particles embedded into an oil of MR fluid 235. In embodiments, the viscosity of MR fluid 235 may depend on an electromagnetic filed applied to the MR fluid using electromagnet coil 233. For example, an amount of current may be applied to electromagnet coil 233, which may generate a corresponding electromagnetic field of a particular strength. The strength of the electromagnetic field may depend on the amount of current applied to electromagnet coil 233. In some embodiments, the higher the amount of current applied to electromagnet coil 233, the greater the strength of the electromagnetic field generated. The electromagnetic field may interact with the iron particles of MR fluid 235 thereby changing the viscosity of MR fluid 235. In embodiments, the viscosity of MR fluid 235 may depend on the strength of the electromagnetic field, which may depend on the amount of current applied to electromagnet coil 233. For example, the greater the strength of the electromagnetic field, the higher the viscosity of MR fluid 235. As such, the viscosity of MR fluid 235 may depend on the amount of current applied to electromagnet coil 233. In this manner, the viscosity of MR fluid 235 may be controlled based on the amount of current applied to electromagnet coil 233.

In embodiments, the amount of torque transferred from input plate 232 to output plate 234 may depend on the viscosity of MR fluid 235. For example, a more viscous MR fluid 235 may cause more friction against input plate 232 and output plate 234, which may cause a large amount of torque to be transferred from input plate 232 to output plate 234 due to the viscosity of MR fluid 235, even though input plate 232 and output plate 234 are not in direct contact, since both input plate 232 and output plate 234 are surrounded by MR fluid 235. On the other hand, a less viscous MR fluid 235 may cause less friction against input plate 232 and output plate 234, which may cause a lesser amount of torque to be transferred from input plate 232 to output plate 234 due to the lower viscosity of MR fluid 235. For example, at a viscosity of MR fluid 235 lower than some minimum threshold, no portion of the torque of input plate 232 (e.g., the torque applied due to the mechanical power provided at output shaft 251 by the mechanical power source) may be transferred to the output plate, which may mean that no mechanical power may be transferred to the load via input shaft 220, and the load may be said to be disengaged from the mechanical power source. On the other hand, at a level of viscosity of MR fluid 235 higher than the minimum threshold but lower than some maximum threshold, a portion of the torque of input plate 232 (e.g., the torque applied due to the mechanical power provided at output shaft 251 by the mechanical power source) corresponding to the level of viscosity of MR fluid 235 may be transferred to the output plate, which may mean a portion (e.g., a portion corresponding to the level of viscosity of MR fluid 235) of the mechanical power received at input plate 232 may be transferred to the load via input shaft 220, and the load may be said to be engaged to the mechanical power source at the transfer power level. In another example, at a level of viscosity of MR fluid 235 higher than the maximum threshold, all of the torque of input plate 232 (e.g., the torque applied due to the mechanical power provided at output shaft 251 by the mechanical power source) may be transferred to the output plate, which may mean that all of the mechanical power received at input plate 232 may be transferred to the load via input shaft 220, and the load may be said to be engaged to the mechanical power source at the full power level.

In embodiments, as the viscosity of MR fluid 235 may be controlled based on the amount of current applied to electromagnet coil 233, and as the amount of mechanical power transferred by MR clutch 230 may depend on the viscosity level of MR fluid 235, the amount of mechanical power transferred by MR clutch 230 may be controlled based on the amount of current applied to electromagnet coil 233. For example, in embodiments, a full amount of mechanical power may be provided from the mechanical power source at input plate 232 via output shaft 251. In embodiments, the portion of the full amount of mechanical power available at input plate 232 that may be transferred to the input shaft 220 via output plate 234 may depend on the amount of current applied to electromagnet coil 233. For example, the maximum current rating of electromagnet coil 233 may be 100%, at which current the viscosity of MR fluid 235 may be above the maximum threshold, and at which point 100% of the mechanical power available at input plate 232 may be transferred to the output plate 232 (and to input shaft 220). In this example, the minimum current rating of electromagnet coil 233 may be 0%, at which current the viscosity of MR fluid 235 may be below the minimum threshold, and at which point 0% of the mechanical power available at input plate 232 may be transferred to the output plate 232 (and to input shaft 220). In this example, it may be determined that a 40% power transfer is to be performed. In this case, 40% of the maximum current rating may be applied to electromagnet coil 233, which may result in a transfer of 40% of the full amount of mechanical power available at input plate 232 to input shaft 220 via output plate 234. In this case, the mechanical power at input shaft 220 may be 40% of the mechanical power at output shaft 251. In another example, it may be determined that a 100% power transfer is to be performed. In this case, 100% of the maximum current rating may be applied to electromagnet coil 233, which may result in a transfer of 100% of the full amount of mechanical power available at input plate 232 to input shaft 220 via output plate 234. In this case, the mechanical power at input shaft 220 may be 100% of the mechanical power at output shaft 251. In this manner, MR clutch 230 may be configured to control the mechanical power transfer from the mechanical power source to the load.

With reference back to FIG. 2A, as noted above, MR clutch 230 may be configured to control the transfer of mechanical power from first mechanical power source 250 to one or more loads 260, and MR clutch 240 may be configured to control the transfer of mechanical power from second mechanical power source 255 to one or more loads 260. As described with reference to FIG. 3, controlling the transfer of mechanical power from a mechanical power source to a load (e.g., a load of one or more loads 260) using an MR clutch may include controlling the amount of current applied to the electromagnet coil of the MR clutch. In embodiments, power distribution controller 210 may be configured to determine the amount of current to be applied to the electromagnet coil of an MR clutch.

In embodiments, power distribution controller 210 may be configured to control and manage the distribution of mechanical power from first mechanical power source 250 and second mechanical power source 255 to one or more loads 260. In embodiments, power distribution controller 210 may be part of a central computer (e.g., a flight control computer, a vehicle electronic control unit, etc.) and may receive information related to operations associated with system 200. For example, power distribution controller 210 may track the usage of the various mechanical power source (e.g., time of use, remaining capacity, number of loads connected to the various mechanical power sources, etc.) and may determine an amount of mechanical power to be transferred from each of first mechanical power source 250 and second mechanical power source 255 to one or more loads 260. In embodiments, power distribution controller 210 may determine an amount of current to be applied at each of MR clutches 230 and 240 in order to transfer the determined amount of mechanical power from each of first mechanical power source 250 and second mechanical power source 255. Power distribution controller 210 may determine the amount of current to be applied to the MR clutches in accordance with the disclosure herein. For example, first mechanical power source 250 may currently be disengaged from one or more loads 260, while second mechanical power source 255 may currently be engaged to at least one of one or more loads 260 and 60% of the mechanical power provided by second mechanical power source 255 may be transferred via MR clutch 240 to the at least one of the one or more loads 260. In this example, power distribution controller 210 may determine to engage first mechanical power source 250 to one or more loads 260 and to transfer 40% of the mechanical power produced by first mechanical power source 250 to the one or more loads 260. In this case, power distribution controller 210 may determine to apply 40% of the maximum current rating of MR clutch 230 to electromagnet 233, which may cause one or more loads 260 to be engaged to first mechanical power source 250 via MR clutch 230. In this case, the mechanical power produced by first mechanical power source 250 may be available at output shaft 251, and 40% of the mechanical power produced by first mechanical power source 250 may be available at input shaft 220.

Following the example above, power distribution controller 210 may determine to disengage second mechanical power source 255 from the one or more loads 260 and to increase the transfer of the mechanical power produced by first mechanical power source 250 to the one or more loads 260 to 80%. In this case, power distribution controller 210 may determine to remove the current applied to electromagnet 243, which may cause MR fluid 245 of MR clutch 240 to becomes less viscous such that no mechanical power may be transferred from output shaft 256 via input plate 242 to input shaft 222 via output plate 244, effectively disengaging second mechanical power source 255 from the one or more loads 260. In this case, power distribution controller 210 may determine to increase the current applied to electromagnet 233 from 40% of the maximum current rating to 80% of the maximum current rating of MR clutch 230. In this case, the mechanical power produced by first mechanical power source 250 may be available at output shaft 251, and 80% of the mechanical power produced by first mechanical power source 250 may be available at input shaft 220.

In embodiments, the configuration of power distribution controller 210 for controlling the mechanical power transfer from a mechanical power source to a load using an MR clutch may include gradually, and/or progressively, increasing or decreasing the amount of mechanical power transferred via the MR clutch to reach a determined, requested, and/or desired power transfer amount. For example, power distribution controller 210 may determine to transfer a percentage amount of the mechanical power produced by a mechanical power source to a load. Power distribution controller 210 may determine a corresponding amount of current to apply to the electromagnet of the MR clutch connecting the load to the mechanical power source corresponding to the determined percentage amount of mechanical power. In this case, rather than immediately applying the corresponding amount of current to the electromagnet of the MR clutch to cause the transfer of the determined percentage amount of mechanical power, power distribution controller 210 may instead ramp up or ramp down (e.g., depending on the current level of transfer) the current applied to the electromagnet of the MR clutch from a current level until the corresponding amount of current is reached. In this manner, engagement or disengagement of a load to a mechanical power source may be performed gradually rather than all at once, which may prevent potential damage to the components.

In embodiments, the ramp up or ramp down of the current by power distribution controller 210 may be over a period of time, such as a period of time greater than 0 seconds. For example, power distribution controller 210 may ramp up a current applied to an electromagnet of a MR clutch to 40% over a period of time that may be greater than. 1 seconds.

For example, first mechanical power source 250 may currently be disengaged from one or more loads 260, while second mechanical power source 255 may currently be engaged to at least one of one or more loads 260 and 50% of the mechanical power provided by second mechanical power source 255 may be transferred via MR clutch 240 to the at least one of the one or more loads 260. In this example, power distribution controller 210 may determine to engage first mechanical power source 250 to one or more loads 260 and to transfer 40% of the mechanical power produced by first mechanical power source 250 to the one or more loads 260, and to increase the transfer of the mechanical power produced by second mechanical power source 255 to the one or more loads 260 to 60% In this case, power distribution controller 210 may determine to ramp up the current applied to electromagnet 233 from a current level of 0% to a 40% of the maximum current rating of MR clutch 230 over a period of time, which may cause one or more loads 260 to be engaged to first mechanical power source 250 via MR clutch 230 and a 40% of the mechanical power produced by first mechanical power source 250 transfer to input shaft 220. In this case, at the beginning of the ramp up period of time, 0% of the mechanical power produced by first mechanical power source 250 may be available at input shaft 220, and at the end of the ramp up period of time, 40% of the mechanical power produced by first mechanical power source 250 may be available at input shaft 220. Further in this case, power distribution controller 210 may determine to ramp up the current applied to electromagnet 243 from 50% of the maximum current rating to 60% of the maximum current rating of MR clutch 230 over a period of time, which may cause a 60% of the mechanical power produced by second mechanical power source 255 transfer to input shaft 222. In this case, at the beginning of the ramp up period of time, 50% of the mechanical power produced by second mechanical power source 255 may be available at input shaft 222, and at the end of the ramp up period of time, 60% of the mechanical power produced by second mechanical power source 255 may be available at input shaft 222.

Following the example above, power distribution controller 210 may determine to disengage second mechanical power source 255 from the one or more loads 260 and to decrease the transfer of the mechanical power produced by first mechanical power source 250 to the one or more loads 260 to 30%. In this case, power distribution controller 210 may determine to ramp down the current applied to electromagnet 243 from 60% of the maximum current rating to 0% over a period of time to effectively disengage second mechanical power source 255 from one or more loads 260. In this case, at the beginning of the ramp down period of time, 60% of the mechanical power produced by second mechanical power source 255 may be available at input shaft 222, and at the end of the ramp up period of time, 0% of the mechanical power produced by second mechanical power source 255 may be available at input shaft 222. Further in this case, power distribution controller 210 may determine to ramp down the current applied to electromagnet 233 from a current level of 40% of the maximum current rating of MR clutch 230 to 30% of the maximum current rating of MR clutch 230 over a period of time, which may cause a 30% of the mechanical power produced by first mechanical power source 250 transfer to input shaft 220. In this case, at the beginning of the ramp down period of time, 40% of the mechanical power produced by first mechanical power source 250 may be available at input shaft 220, and at the end of the ramp down period of time, 30% of the mechanical power produced by first mechanical power source 250 may be available at input shaft 220.

Figure 2B:
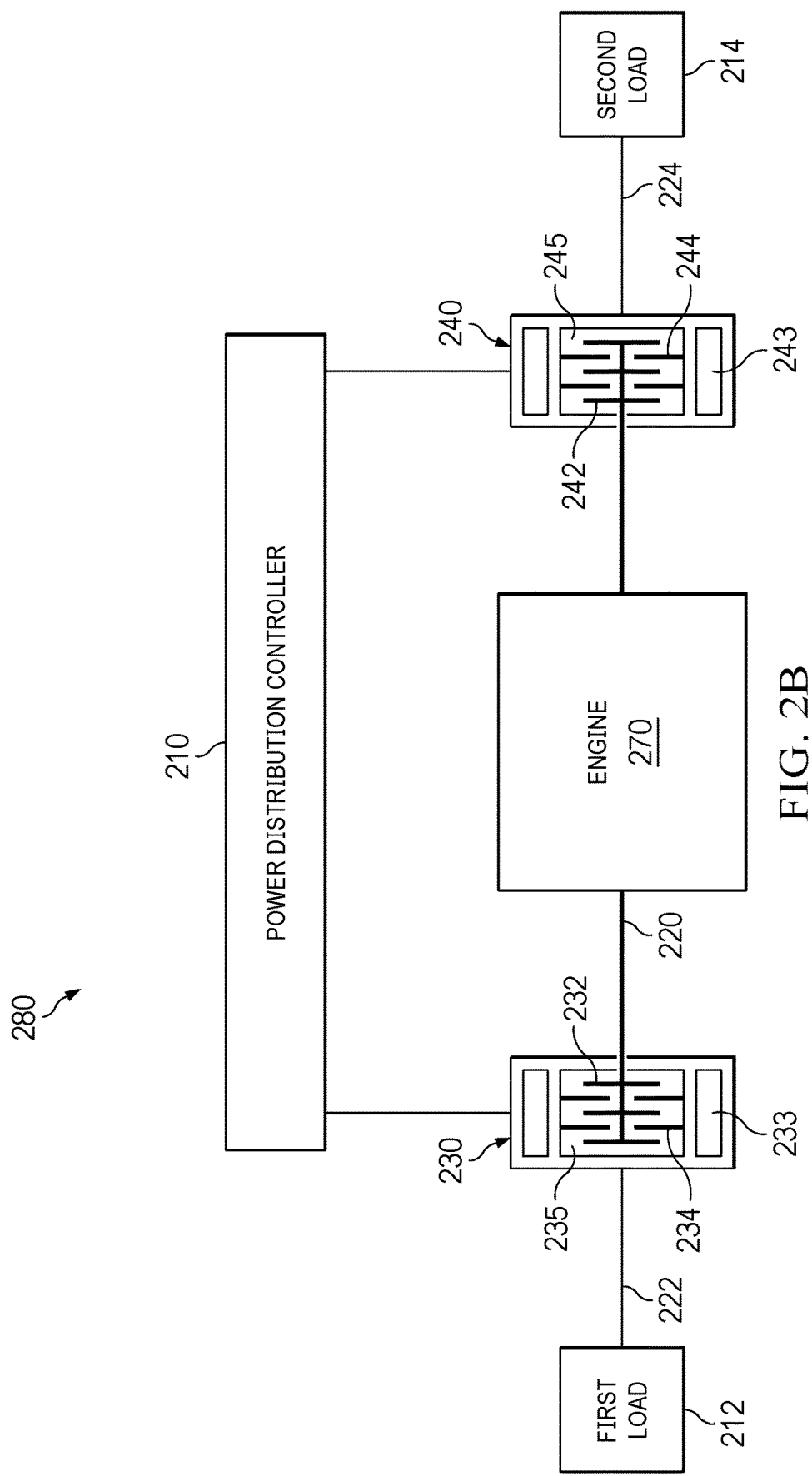
FIG. 2B is a block diagram of an exemplary system configured with capabilities and functionality for controlling a power distribution of a hybrid powertrain system using MR clutches in accordance with embodiments of the present disclosure.

FIG. 2B is a block diagram of an exemplary system 280 configured with capabilities and functionality for controlling a power distribution of a hybrid powertrain system using MR clutches in accordance with embodiments of the present disclosure. In particular, functionality of system 280, and components thereof, may be similar to the functionality described above with respect to FIG. 2A, although in a different configuration. For example, exemplary system 280 may include functionality for controlling power transfer from a mechanical power source to a plurality of loads.

As shown in FIG. 2B, system 280 may include an engine 270 configured to provide mechanical power to one or more loads. In embodiments, engine 270 may include a mechanical power source of a first type (e.g., an ICE). First load 212 may be operably connected to engine 270 via MR clutch 230, and second load 14 may be operably connected to engine 270 via MR clutch 240. In embodiments, MR clutch 230 may be configured to control the transfer of mechanical power from engine 270 to first load 212, and MR clutch 240 may be configured to control the transfer of mechanical power from engine 270 to first load 214. In embodiments, functionality of MR clutch 230 and MR clutch 240 to control the mechanical power transfer from engine 270 to the respective load may be similar to the functionality of MR clutches 230 and 240 as described above with respect to FIG. 2A and FIG. 3.

In embodiments, first load 212 and second load 212 may include one or more mechanical loads configured to receive the mechanical power transferred from a mechanical power source and to use the mechanical power received to provide movement. For example, in embodiments, system 280 may be a hybrid power system of an aircraft, in which engine 270 may include an ICE, and first load 212 may include a generator. In this example, engine 270 may provide mechanical power (e.g., via MR clutch 230) to drive the generator. The generator may be configured to provide electric power for charging a battery connected to an electric motor. The electric motor may provide a mechanical power for driving a lift propeller that may be used to lift the aircraft vertically. In this example, second load 214 may include one or more propellers. In this case, the mechanical power provided by engine 270 (e.g., via MR clutch 240) may be used to rotate the one or more propellers to provide propulsion power to the aircraft.

In some embodiments, first load 212 and/or second load 212 may include a drivetrain of a car, in which case the mechanical power provided by engine 270 may be used to rotate one or more wheels to move the car. It should be appreciated that these examples of first load 212 and/or second load 212 are for illustrative purposes and should not be construed as limiting in any way. In some embodiments, other types of loads may be included in first load 212 and/or second load 212, such as propellers on a boat, a generator, a turbine, etc. Indeed, first load 212 and/or second load 212 may include any type of load that may employ mechanical power.

In embodiments, MR clutch 230 and MR clutch 240 may be configured to control the distribution of mechanical power generated by engine 270 between first load 212 and second load 214. In embodiments, controlling the distribution of mechanical power generated by engine 270 may include controlling the transfer of mechanical power from engine 270 to each of first load 212 and second load 214 using the respective one of MR clutch 230 and 240. For example, MR clutch 230 may be configured to control the amount of torque that may be transferred from output shaft 220 of engine 270 to input shaft 222 of first load 212. As shown, output shaft 220 of engine 270 may be connected to MR clutch 230 (e.g., may be connected to input plate 232 of MR clutch 230) and input shaft 222 of first load 212 may be connected to MR clutch 230 (e.g., may be connected to output plate 234 of MR clutch 230). Similarly, MR clutch 240 may be configured to control the amount of torque that may be transferred from output shaft 220 of engine 270 to input shaft 224 of second load 214. For example, output shaft 220 of engine 270 may be connected to MR clutch 240 (e.g., may be connected to input plate 242 of MR clutch 240) and input shaft 224 of second load 214 may be connected to MR clutch 240 (e.g., may be connected to output plate 244 of MR clutch 40). As shown, there may be no direct mechanical connection between the input plate and the output plate of an MR clutch, which may mean that there may be no direct mechanical connection between the output shaft of engine 270 and the input shaft of a load to which power may be transferred. In embodiments, MR fluid 235 may surround input plate 232 and output plate 234 of MR clutch 230, and MR fluid 45 may surround input plate 2 and output plate 244 of MR clutch 240. In embodiments, as described above with respect to FIGS. 2A and 3, controlling the amount of mechanical power that is transferred from engine 270 to one or more of first load 212 and second load 214 may include controlling the current applied to one or more of electromagnet coils 233 and 243 to vary the viscosity of MR fluids 235 and/or 245.

In embodiments, power distribution controller 210 may be configured to control and manage the distribution of mechanical power from engine 270 to one or more of first load 212 and second load 214. In embodiments, power distribution controller 210 may be part of a central computer (e.g., a flight control computer, a vehicle electronic control unit, etc.) and may receive information related to operations associated with system 200. In embodiments, power distribution controller 210 may determine an amount of current to be applied to each of MR clutches 230 and 240 in order to transfer the determined amount of mechanical power from engine 270 to each of first load 212 and second load 21.

In embodiments, power distribution controller 210 may determine the amount of current to be applied to the MR clutches in accordance with the disclosure herein. For example, first load 212 may currently be disengaged from engine 270, while second load 214 may currently be engaged to engine 270 at a 60% transfer level, which may indicate that 60% of the mechanical power provided by engine 270 may be transferred via MR clutch 240 to second load 214. In this example, power distribution controller 210 may determine to engage first load 212 to engine 270 at a 40% transfer level, which may mean that 40% of the mechanical power produced by engine 270 is to be transferred to first load 212. In this case, power distribution controller 210 may determine to apply 40% of the maximum current rating of MR clutch 230 to electromagnet 233, which may cause first load 212 to be engaged to engine 270 via MR clutch 230. In this case, 100% of the mechanical power produced by engine 270 may be available at output shaft 251, and 40% of the mechanical power produced by first mechanical power source 250 may be available at input shaft 222.

Following the example above, power distribution controller 210 may determine to disengage second load 214 from engine 270 and to increase the transfer level to first load 212 to 80%. In this case, power distribution controller 210 may determine to remove the current applied to electromagnet 243, which may cause MR fluid 245 of MR clutch 240 to become less viscous such that no mechanical power may be transferred from output shaft 220 via input plate 242 to input shaft 224 via output plate 244, effectively disengaging second load 214 from engine 270. In this case, power distribution controller 210 may determine to increase the current applied to electromagnet 233 from 40% of the maximum current rating to 80% of the maximum current rating of MR clutch 230. In this case, the mechanical power produced by engine 270 may be available at output shaft 251, and 80% of the mechanical power produced by engine 270 may be available at input shaft 222.

In embodiments, as described above, the configuration of power distribution controller 210 for controlling the mechanical power transfer from a mechanical power source to a load using an MR clutch may include gradually, and/or progressively, increasing or decreasing the amount of mechanical power transferred via the MR clutch to reach a determined, requested, and/or desired power transfer amount, rather than immediately applying a corresponding amount of current to the electromagnet of the MR clutch to cause the transfer of the mechanical power. Instead, power distribution controller 210 may ramp up or ramp down (e.g., depending on the current level of transfer) the current applied to the electromagnet of the MR clutch from a current level until the corresponding amount of current is reached. In this manner, engagement or disengagement of a load to a mechanical power source may be performed gradually rather than all at once, which may prevent potential damage to the components.

In embodiments, the ramp up or ramp down of the current by power distribution controller 210 may be over a period of time, such as a period of time greater than 0 seconds. For example, power distribution controller 210 may ramp up a current applied to an electromagnet of an MR clutch to 40% over a period of time that may be greater than. 1 seconds.

For example, first load 212 may currently be disengaged from engine 270, while second load 214 may currently be engaged to engine 270 at a 50% power transfer level, which may indicate that 50% of the mechanical power provided by engine 270 may be transferred via MR clutch 240 to second load 214. In this example, power distribution controller 210 may determine to engage first load 212 to engine 270 at a 40% transfer level, and to increase the transfer level to second load 214 to 60% In this case, power distribution controller 210 may determine to ramp up the current applied to electromagnet 233 from a current level of 0% to a 40% of the maximum current rating of MR clutch 230 over a period of time, which may cause first load 212 to be engaged to engine 270 and a 40% of the mechanical power produced by engine 270 to transfer to input shaft 222. In this case, at the beginning of the ramp up period of time, 0% of the mechanical power produced by engine 270 may be available at input shaft 222, and at the end of the ramp up period of time, 40% of the mechanical power produced by engine 270 may be available at input shaft 222. Further in this case, power distribution controller 210 may determine to ramp up the current applied to electromagnet 243 from 50% of the maximum current rating to 60% of the maximum current rating of MR clutch 230 over a period of time, which may cause a 60% of the mechanical power produced by engine 270 to transfer to input shaft 224. In this case, at the beginning of the ramp up period of time, 50% of the mechanical power produced by engine 270 may be available at input shaft 224, and at the end of the ramp up period of time, 60% of the mechanical power produced by engine 270 may be available at input shaft 224.

Following the example above, power distribution controller 210 may determine to disengage second load 214 from engine 270 and to decrease the transfer of the mechanical power produced by engine 270 to the first load 212 from 40% to 30%. In this case, power distribution controller 210 may determine to ramp down the current applied to electromagnet 243 from 60% of the maximum current rating to 0% over a period of time to effectively disengage engine 270 from second load 214. In this case, at the beginning of the ramp down period of time, 60% of the mechanical power produced by engine 270 may be available at input shaft 224, and at the end of the ramp up period of time, 0% of the mechanical power produced by engine 270 may be available at input shaft 224. Further in this case, power distribution controller 210 may determine to ramp down the current applied to electromagnet 233 from a current level of 40% of the maximum current rating of MR clutch 230 to 30% of the maximum current rating of MR clutch 230 over a period of time, which may cause 30% of the mechanical power produced by engine 270 to transfer to input shaft 222. In this case, at the beginning of the ramp down period of time, 40% of the mechanical power produced by engine 270 may be available at input shaft 222, and at the end of the ramp down period of time, 30% of the mechanical power produced by engine 270 may be available at input shaft 222.

Figure 4:
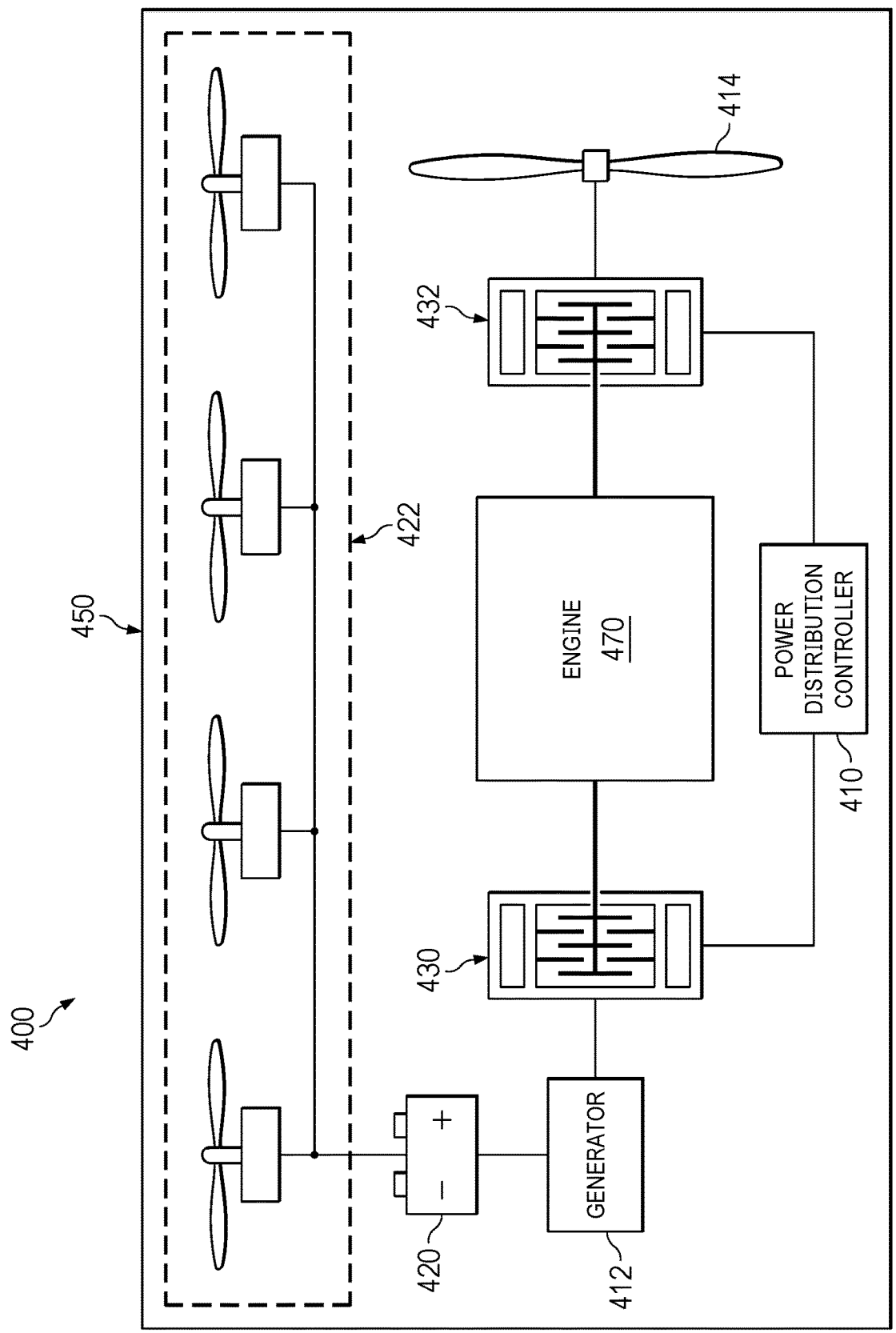
FIG. 4 is a block diagram of an exemplary system configured with capabilities and functionality for controlling a power distribution of a hybrid powertrain system using MR clutches in accordance with embodiments of the present disclosure.

FIG. 4 is a block diagram of an exemplary system 400 configured with capabilities and functionality for controlling a power distribution of a hybrid powertrain system using MR clutches in accordance with embodiments of the present disclosure. In embodiments, system 400 may represent a hybrid power system of an aircraft 450. As shown in FIG. 4, system 400 may include engine 470. In embodiments, engine 470 may include a mechanical power source of a first type (e.g., an ICE) configured to provide a mechanical power. In embodiments, engine 470 may be configured to provide the mechanical power at various levels between a minimum level of mechanical power and a maximum level of mechanical power. In some embodiments, engine 470 may be configured to provide a constant amount of mechanical power during operations.

In embodiments, pusher propeller 414 may be connected to engine 470 via MR clutch 432. Pusher propeller 414 may be configured to provide a pushing propelling force for aircraft 450. For example, mechanical power transferred from engine 470 to pusher propeller 414 via MR clutch 432 may cause pusher propeller 414 to rotate causing providing a propulsion power to the aircraft. In some embodiments, pusher propeller may be configured to provide a propelling force in a horizontal flight mode of aircraft 450.

In embodiments, MR clutch 432 may be configured to control the transfer of mechanical power from engine 470 to pusher propeller 414, in accordance with embodiments of the present disclosure. In embodiments, functionality of MR clutch 432 to control the mechanical power transfer from engine 470 to pusher propeller 414 may be in accordance with the functionality of MR clutches 230 and 240, as described above with respect to FIGS. 2A, 2B, and 3.

In embodiments, system 400 of aircraft 450 may include one or more electrically driven lift rotors 422. In embodiments, one or more electrically driven lift rotors 422 may include at least one electrical motor and propeller that may be configured to provide a lift force for aircraft 450. For example, electrically driven lift rotors 422 may be operably connected to batter 420. Battery 420 may be configured to provide electrical power to electrically driven lift rotors 422 to cause electrically driven lift rotors 422 to rotate and provide a lifting force that may be used in a vertical flight mode of aircraft 450. In this manner, battery 420 may provide the electrical power for the electrical motors of electrically driven lift rotors 422 to generate the mechanical force to generate the lift force. As shown in FIG. 4, battery 420 may be operable connected to generator 412. Generator 412 may be configured to generate an electrical charge that may be used to charge battery 420. Generator 412 may be operable connected to engine 470 via MR clutch 430. Mechanical power may be transferred from engine 470 to generator 412 via MR clutch 430, and the transferred mechanical power may cause generator 412 to generate electrical power to charge battery 420. In embodiments, the power level generated by generator 412 may depend on the amount of mechanical power transferred from engine 470 to generator 412 via MR clutch 430. In embodiments, the greater the amount of mechanical power transferred from engine 470 to generator 412 via MR clutch 430, the greater the power level generated by generator 412.

In embodiments, MR clutch 430 may be configured to control the transfer of mechanical power from engine 470 to generator 412, in accordance with embodiments of the present disclosure. In embodiments, functionality of MR clutch 430 to control the mechanical power transfer from engine 470 to generator 412 may be in accordance with the functionality of MR clutches 230 and 240, as described above with respect to FIGS. 2A, 2B, and 3.

Power distribution controller 410 may be configured to control and manage the distribution of mechanical power from engine 470 to generator 412 and pusher propeller 414, using MR clutch 430 and MR clutch 432, respectively. In embodiments, power distribution controller 410 may be part of a flight control computer (not shown) of aircraft 450 or may be the flight control computer. Power distribution controller 410 may receive information related to operations associated with aircraft 450 and may determine a distribution of mechanical power from engine 470 to generator 412 and pusher propeller 414. In embodiments, the distribution of mechanical power from engine 470 to generator 412 and pusher propeller 414 may be based on the flight mode at which aircraft 450 may be operating.

For example, aircraft 450 may be a vertical takeoff and landing (VTOL) aircraft configured to takeoff and land vertically. In embodiments, aircraft 450 may include a vertical flight mode in which the aircraft may fly vertically (e.g., for takeoff and/or landing). In this vertical flight mode, aircraft 450 may relay on one or more electrically driven lift rotors 422 to provide the lifting force required to move aircraft 450 up and/or down.

In embodiments, during vertical flight mode, power distribution controller 410 may determine to disengage pusher propeller 414 from engine 470. For example, power distribution controller 410 may determine that, since the lift force required for vertical flight is provided by one or more electrically driven lift rotors 422, pusher propeller 414 may not be used. In this case, power distribution controller 410 may determine to remove the current applied to the electromagnet coil of MR clutch 432, which may cause the MR fluid of MR clutch 432 to become less viscous such that no mechanical power may be transferred from the output shaft of engine 470 to pusher propeller 414, effectively disengaging pusher propeller 414 from engine 470.

In this example, during vertical flight mode, power distribution controller 410 may determine to engage generator 412 to engine 470 at full power transfer level. In this case, power distribution controller 410 may determine to apply (e.g., by ramping up) a current to the electromagnet coil of MR clutch 430 from a current level to 100% of the maximum current rating of MR clutch 430 over a period of time, which may cause generator 412 to be engaged to engine 470 and 100% of the mechanical power produced by engine 470 may be transferred from engine 470 to generator 412. In this case, at the beginning of the ramp up period of time, an initial percentage (e.g., 0% or another non-zero percentage less than 100%) of the mechanical power produced by engine 270 may be transferred from engine 470 to generator 412, and at the end of the ramp up period of time, 100% of the mechanical power produced by engine 470 may be transferred from engine 470 to generator 412.

In embodiments, the mechanical power received by generator 412 may cause generator 412 to generate a charge for charging battery 420 at a maximum capacity by generator 412. One or more electrically driven lift rotors 422 may draw power from battery 420 to operate. In embodiments, the power drawn by one or more electrically driven lift rotors 422 from battery 420 during the vertical flight mode may be greater than the electrical charge produced by generator 412 from the mechanical power provided by engine 470. In this manner, the power drawn by one or more electrically driven lift rotors 422 is greater than the power produced by engine 470, and in this case, battery 420 may experience a net discharge during vertical flight mode.

In embodiments, aircraft 450 may include a first horizontal flight mode. In the first horizontal flight mode, aircraft 450 may move in the horizontal plane, and may rely on pusher propeller 414 to provide the pushing force required to move aircraft 450 along the horizontal plane. During the first horizontal flight mode, one or more electrically driven lift rotors 422 may not be used.

In embodiments, during the first horizontal flight mode, power distribution controller 410 may determine that one or more electrically driven lift rotors 422 do not need to be used. In this case, power distribution controller 410 may determine to disengage generator 412 from engine 470. For example, power distribution controller 410 may determine to remove the current applied to the electromagnet coil of MR clutch 430, which may cause the MR fluid of MR clutch 430 to become less viscous such that no mechanical power may be transferred from the output shaft of engine 470 to generator 412, effectively disengaging generator 412 from engine 470. In embodiments, one or more electrically driven lift rotors 422 may be shut down in the first horizontal flight mode, and the battery may provide power for flight controllers and other low power systems of aircraft 450.

In this example, during the first horizontal flight mode, power distribution controller 410 may determine to engage pusher propeller to engine 470 at a power transfer level determined based on the operational requirements of aircraft 450. For example, it may be determined that aircraft 450 is to fly at a particular speed, and a particular rotational speed for pusher propeller 414 may be determined. Based on this, power distribution controller 410 may determine a percentage of the mechanical power provided by engine 470 to transfer to pusher propeller 414. In this case, power distribution controller 410 may control MR clutch 432 (e.g., by applying a corresponding current at the electromagnet coil of MR clutch 432) to transfer the determined percentage of the mechanical power provided by engine 470 to pusher propeller 414. For example, power distribution controller 410 may determine that 55% of the mechanical power provided by engine 470 is to be transferred to pusher propeller 414. In this case, power distribution controller 410 may determine to apply (e.g., by ramping up or down) a current to the electromagnet coil of MR clutch 430 from a current level to 55% of the current rating of MR clutch 432 over a period of time, which may cause 55% of the mechanical power produced by engine 470 to be transferred to pusher propeller 414.

In embodiments, the mechanical power received by generator 412 may cause generator 412 to generate a charge for charging battery 420 at a maximum capacity by generator 412. One or more electrically driven lift rotors 422 may draw power from battery 420 to operate. In embodiments, the power drawn by one or more electrically driven lift rotors 422 from battery 420 during the vertical flight mode may be greater than the electrical charge produced by generator 412 from the mechanical power provided by engine 470. In this manner, the power drawn by one or more electrically driven lift rotors 422 is greater than the power produced by engine 470, and in this case, battery 420 may experience a net discharge during vertical flight mode.

In embodiments, aircraft 450 may include a second horizontal flight mode. In the second horizontal flight mode, aircraft 450 may move in the horizontal plane, and may rely on pusher propeller 414 to provide the pushing force required to move aircraft 450 along the horizontal plane. During the second horizontal flight mode, one or more electrically driven lift rotors 422 may not be used.

In embodiments, during the second horizontal flight mode, power distribution controller 410 may determine that even though one or more electrically driven lift rotors 422 do not need to be used, batter 420 is to be charged. Additionally, power distribution controller 410 may determine that pusher propeller is to be engaged to engine 470 at a power transfer level determined based on the operational requirements of aircraft 450. In these embodiments, power distribution controller 410 may determine a power transfer level for each of generator 412 and pusher propeller 414 and may control the respective MR clutch to effect the determined power transfer level. In this manner, during the second horizontal flight mode, engine 470 may provide mechanical power to both generator 412 (e.g., to charge battery 420) and pusher propeller 414 (e.g., to provide horizontal pushing force for aircraft 450).

In these embodiments, power distribution controller 410 may determine to engage generator 412 to engine 470 at first power transfer level, which may be a first percentage value and may be less than 100% of the mechanical power generated by engine 470. In this case, power distribution controller 410 may determine to apply (e.g., by ramping up) a current to the electromagnet coil of MR clutch 430 from a current level to the first percentage of the maximum current rating of MR clutch 430 over a period of time, which may cause generator 412 to be engaged to engine 470 and the first percentage of the mechanical power produced by engine 470 may be transferred from engine 470 to generator 412. In this case, at the beginning of the ramp up period of time, an initial percentage (e.g., 0% or another non-zero percentage less than 100%) of the mechanical power produced by engine 270 may be transferred from engine 470 to generator 412, and at the end of the ramp up period of time, the first percentage of the mechanical power produced by engine 470 may be transferred from engine 470 to generator 412.

In these embodiments, power distribution controller 410 may determine to engage pusher propeller to engine 470 at a second power transfer level determined based on the operational requirements of aircraft 450. For example, it may be determined that aircraft 450 is to fly at a particular speed, and a particular rotational speed for pusher propeller 414 may be determined. Based on this, power distribution controller 410 may determine a second percentage of the mechanical power provided by engine 470 to transfer to pusher propeller 414. In this case, power distribution controller 410 may control MR clutch 432 (e.g., by applying a corresponding current at the electromagnet coil of MR clutch 432) to transfer the second percentage of the mechanical power provided by engine 470 to pusher propeller 414 over a period of time.

In some embodiments, the first percentage (e.g., the percentage of the mechanical power produced by engine 470 transferred from engine 470 to generator 412) and the may add up to 100% of the mechanical power produced by engine 470.

In embodiments, during operations (e.g., during vertical flight mode, first horizontal flight mode, and/or second horizontal flight mode), power distribution controller 410 may determine to update the transfer levels from engine 470 to generator 412 and/or pusher propeller 414 and may control MR clutches 430 and 432 to update the power transfer levels.

Figure 5:
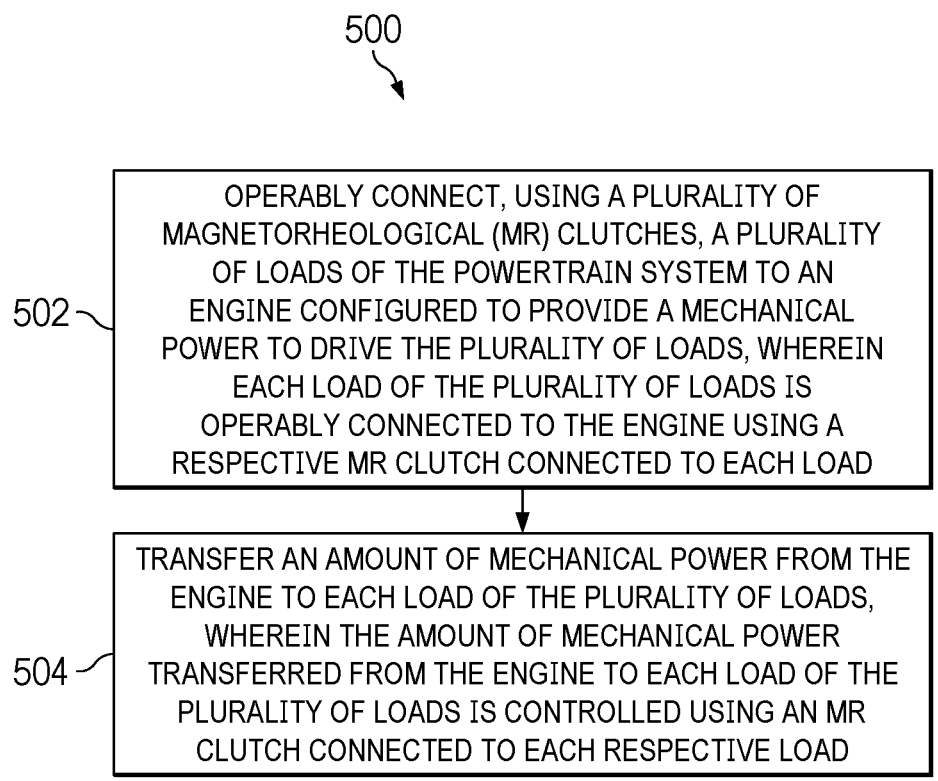
FIG. 5 shows a high-level flow diagram of operations of a system for providing functionality for controlling a power distribution of a hybrid powertrain system using MR clutches in accordance with embodiments of the present disclosure.

FIG. 5 shows a high-level flow diagram 500 of operation of a system configured for providing functionality for controlling a power distribution of a powertrain system in accordance with embodiments of the present disclosure. For example, the functions illustrated in the example blocks shown in FIG. 5 may be performed by system 200 of FIG. 2A, system 280 of FIG. 2B, and/or system 400 of FIG. 4 according to embodiments herein. In embodiments, the operations of the method 500 may be stored as instructions that, when executed by one or more processors, cause the one or more processors to perform the operations of the method 500.

For example, in embodiments, method 500 may be implemented as control logic that may be implemented as an algorithm on a processor (e.g., controller, microprocessor, FPGA, ASIC, CPU, computer, server, etc.), or other suitable system. Additionally, the control logic may be implemented with software, hardware, firmware, an API, a network connection, a network transfer protocol, HTML, DHTML, JavaScript, JSON, system bus, other suitable application, or a suitable combination thereof. The control logic may interface electrical components to control electrical components (e.g., power-routing buses, diacs, switches, etc.) and mechanical components (e.g., actuators, latches, etc.) using logic processors.

In an embodiment, the control logic for implementing method 500 may interface with a memory for storing information about an aircraft, aircraft assets, flight information, alerts, and battery modules in a plurality of network-based, non-transitory storage devices having the collection of aircraft information thereon. Additionally, the control logic may interface the memory with a networked computer processor operably coupled to the memory and capable of executing machine-readable instructions to perform program steps. The control logic implementing hardware components (e.g., processor) may be capable of executing machine-readable instructions to perform program steps and operably coupled to a memory for storing the information about the aircraft, aircraft assets, flight information, alerts, and battery modules.

The control logic for implementing method 500 may leverage the ability of a computer platform to spawn multiple processes and threads by processing data simultaneously. The speed and efficiency of the control logic may be greatly improved by instantiating more than one process for monitoring a status of the aircraft, aircraft assets, flight information, alerts, and battery modules. However, one skilled in the art of programming will appreciate that use of a single processing thread may also be utilized and is within the scope of the present disclosure. The control logic may also be distributed amongst a plurality of networked computer processors.

At 502, in one embodiment, a plurality of loads of a powertrain system may be operably connected, using a plurality of MR clutches, to an engine configured to provide a mechanical power to drive the plurality of loads. In embodiments, each load of the plurality of loads may be operably connected to the engine using a respective MR clutch connected to each load. In embodiments, a configuration for operably connecting a plurality of loads of a powertrain system, using a plurality of MR clutches, to an engine configured to provide a mechanical power to drive the plurality of loads may be in accordance with the description of FIGS. 2A, 2B, and 4.

At 504, an amount of mechanical power is transferred from the engine to each load of the plurality of loads. In embodiments, the amount of mechanical power transferred from the engine to each load of the plurality of loads is controlled using an MR clutch connected to each respective load. In embodiments, functionality of a power distribution controller (e.g., power distribution controller 210 and power distribution controller 410 as shown in FIGS. 2A, 2B, and 4) may be used to transfer an amount of mechanical power from the engine to each load of the plurality of loads. In embodiments, the power distribution controller may perform operations to transfer an amount of mechanical power from the engine to each load of the plurality of loads according to operations and functionality as described above with reference to power distribution controller 210 and power distribution controller 410, and as illustrated in FIGS. 2A, 2B, and 4.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

None of the claims can be intended to invoke 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112 (f). Even under the broadest reasonable interpretation, in light of this paragraph of this specification, the claims are not intended to invoke 35 U.S.C. § 112 (f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. The scope of the claims can include one, some, or portions of any of the embodiments disclosed herein, either alone or in combination. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A system for controlling a power distribution of a powertrain system, the system comprising:
    an engine configured to provide a mechanical power to drive a plurality of loads of the powertrain system;
    the plurality of loads, wherein each load of the plurality of loads is operably connected to the engine;
    a plurality of magnetorheological (MR) clutches connected to the plurality of loads, wherein each MR clutch of the plurality of MR clutches is configured to:
        operably connect a respective one of the plurality of loads to the engine to transfer mechanical power from the engine to the respective one of the plurality of loads; and
        control an amount of mechanical power transferred from the engine to the respective one of the plurality of loads by receiving an amount of current corresponding to a requested amount of mechanical power to be transferred from the engine to the respective one of the plurality of loads connected to the MR clutch and varying, in response to receiving the amount of current, a viscosity of an MR fluid of the MR clutch to vary an amount of torque transferred via the MR clutch from a driveshaft of the engine to a driveshaft of the respective one of the plurality of loads such that the amount of torque transferred from the driveshaft of the engine to the driveshaft of the respective one of the plurality of loads corresponds to the requested amount of mechanical power, wherein:
            to increase the amount of mechanical power transferred from the engine to the respective one of the plurality of loads, the MR clutch receives the amount of current as a ramp up signal over a period of time, wherein the amount of current received by the MR clutch increases from a first amount to the amount of current corresponding to the requested amount of mechanical power over the period of time; and
            to decrease the amount of mechanical power transferred from the engine to the respective one of the plurality of loads, the MR clutch receives the amount of current as a ramp down signal over a period of time, wherein the amount of current received by the MR clutch decreases from a first amount to the amount of current corresponding to the requested amount of mechanical power over the period of time.

2. The system of claim 1, wherein the powertrain system includes a hybrid powertrain system including loads of different types.

3. The system of claim 1, wherein the requested amount of mechanical power to be transferred from the engine to the load connected to the MR clutch is one of:

a minimum amount of mechanical power indicating that the load is to be disengaged from the engine; or a maximum amount of mechanical power indicating that the load is to be engaged to the engine.

4. The system of claim 1, wherein a first load of the plurality of loads includes at least one propeller of an aircraft, the propeller configured to provide horizontal propulsion for the aircraft.

5. The system of claim 4, wherein a second load of the plurality of loads includes a generator, wherein the generator is connected to a battery configured to provide electrical power to at least one electric motor including at least one lift propeller of the aircraft configured to provide vertical lift for the aircraft.

6. The system of claim 5, wherein during a vertical flight mode, the engine operates at full power and the configuration of each MR clutch of the plurality of MR clutches to control the amount of mechanical power transferred from the engine to the respective one of the plurality of loads includes configuration of:

a first MR clutch to disengage the propeller from the engine; and a second MR clutch to engage the generator to the engine to receive the full power from the engine.

7. The system of claim 6, wherein the generator charges the battery and the battery provides the electrical power to the at least one electric motor including the at least one lift propeller of the aircraft to provide vertical lift for the aircraft, and wherein the electrical power provided by the battery to the at least one electric motor is greater than the charge received from the generator.

8. The system of claim 5, wherein during a first horizontal flight mode, the engine operates at full power and the configuration of each MR clutch of the plurality of MR clutches to control the amount of mechanical power transferred from the engine to the respective one of the plurality of loads includes configuration of:

a first MR clutch to engage the propeller to the engine to receive the full power from the engine, the propeller providing the horizontal propulsion for the aircraft; and a second MR clutch to disengage the generator from the engine.

9. The system of claim 5, wherein during a second horizontal flight mode, the engine operates at full power and the configuration of each MR clutch of the plurality of MR clutches to control the amount of mechanical power transferred from the engine to the respective one of the plurality of loads includes configuration of:

a first MR clutch to engage the propeller to the engine to receive at least a first portion of the full power from the engine based on the first MR clutch, the propeller providing the horizontal propulsion for the aircraft; and a second MR clutch to engage the generator to the engine to receive at least a second portion of the full power from the engine based on the second MR clutch, the generator providing a charge for the battery.

10. A method of controlling a power distribution of a powertrain system, comprising:

operably connecting, using a plurality of magnetorheological (MR) clutches, a plurality of loads of the powertrain system to an engine configured to provide a mechanical power to drive the plurality of loads, wherein each load of the plurality of loads is operably connected to the engine using a respective MR clutch connected to each load; and transferring an amount of mechanical power from the engine to each load of the plurality of loads, wherein the amount of mechanical power transferred from the engine to each load of the plurality of loads is controlled using an MR clutch connected to each respective load, wherein controlling the amount of mechanical power transferred from the engine to a load of the plurality of loads using the MR clutch connected to the load includes applying an amount of current to the MR clutch to control a viscosity of an MR fluid of the MR clutch to vary an amount of torque transferred via the MR clutch from a driveshaft of the engine to a driveshaft of the load connected to the MR clutch, including:

applying the amount of current as a ramp up signal over a period of time to increase the amount of mechanical power transferred from the engine to the load connected to the MR clutch, wherein the amount of current applied to the MR clutch is increased from a first amount to the amount of current over the period of time; and applying the amount of current as a ramp down signal over a period of time to decrease the amount of mechanical power transferred from the engine to the load connected to the MR clutch, wherein the amount of current applied to the MR clutch is decreased from a first amount to the amount of current over the period of time.

11. The method of claim 10, wherein:

a first load of the plurality of loads includes at least one propeller of an aircraft, the propeller configured to provide horizontal propulsion for the aircraft; and a second load of the plurality of loads includes a generator, wherein the generator is connected to a battery configured to provide electrical power to at least one electric motor including at least one lift propeller of the aircraft configured to provide vertical lift for the aircraft.

12. The method of claim 11, wherein during a vertical flight mode, the engine operates at full power and controlling the amount of mechanical power transferred from the engine to each load of the plurality of loads using an MR clutch connected to each respective load includes:

disengaging, using a first MR clutch, the propeller from the engine; and engaging, using a second MR clutch, the generator to the engine to receive the full power from the engine, wherein the generator charges the battery and the battery provides the electrical power to the at least one electric motor including the at least one lift propeller of the aircraft to provide vertical lift for the aircraft, and wherein the electrical power provided by the battery to the at least one electric motor is greater than the charge received from the generator.

13. The system of claim 11, wherein during a first horizontal flight mode, the engine operates at full power and controlling the amount of mechanical power transferred from the engine to each load of the plurality of loads using an MR clutch connected to each respective load includes:

engaging, using a first MR clutch, the propeller to the engine to receive the full power from the engine, the propeller providing the horizontal propulsion for the aircraft; and disengaging, using a second MR clutch, the generator from the engine.

14. The system of claim 11, wherein during a second horizontal flight mode, the engine operates at full power and controlling the amount of mechanical power transferred from the engine to each load of the plurality of loads using an MR clutch connected to each respective load includes:

engaging, using a first MR clutch, the propeller to the engine to receive at least a first portion of the full power from the engine based on the first MR clutch, the propeller providing the horizontal propulsion for the aircraft; and engaging, using a second MR clutch, the generator to the engine to receive at least a second portion of the full power from the engine based on the second MR clutch, the generator providing a charge for the battery.

* * * * *